(12) United States Patent
Rich et al.

(10) Patent No.: US 7,003,659 B2
(45) Date of Patent: Feb. 21, 2006

(54) METHOD AND/OR APPARATUS FOR RELIABLY BOOTING A COMPUTER SYSTEM

(75) Inventors: Daniel A. Rich, Gilbert, AZ (US); Robert L. Huff, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 10/136,017

(22) Filed: Apr. 29, 2002

(65) Prior Publication Data

US 2003/0204709 A1 Oct. 30, 2003

(51) Int. Cl.
G06F 9/24 (2006.01)
G06F 15/177 (2006.01)
(52) U.S. Cl. .............................. 713/2; 713/1
(58) Field of Classification Search .................... 713/2; 714/55, 34
See application file for complete search history.

(56) References Cited

U.S. PATENT DOCUMENTS 5,978,911 A * 11/1999 Knox et al. ..................... 713/1
6,560,726 B1 * 5/2003 Vrhel et al. .................... 714/55

* cited by examiner

*Primary Examiner*—A. Elamin
*Assistant Examiner*—Stefan Stoynov
(74) *Attorney, Agent, or Firm*—Crystal D. Sayles

(57) ABSTRACT

A method for booting a computer. The method includes initiating a timer for a load and boot process. The load and boot process is monitored. Monitoring includes determined whether or not the load and boot process is completed successfully. Upon substantial completion of the load and boot process, the time is deactivated. The computer may be reset or sent into a system management mode of operation if the timer expires prior to completion of the load and boot process.

22 Claims, 2 Drawing Sheets

METHOD AND/OR APPARATUS FOR RELIABLY BOOTING A COMPUTER SYSTEM

BACKGROUND

Computing systems include the capability to perform logic and/or arithmetic operations. Computing systems may include, for example, personal computers, laptop computers, or servers. A computing system may include code in the form of instructions, including but not limited to one or more device drivers or operating systems. Many commonly known operating systems include, for example, Windows® 98 and NT, and the Unix and Linux classification or family of operating systems. Operating systems such as the ones described may manage and integrate several differing types of software and hardware, and provide a centralized access point for a user to utilize one or more of the hardware and/or software components.

When a computing system is initially powered on, the computing system can "hang" or not boot properly. This may be due to a number of factors, such as, for example, a missing or corrupted system file or kernel, or a malfunctioning hardware component. In this situation, user intervention may be required. This user intervention may consist of resetting the system, but may also require access and/or modification of one or more system files. For a system where there is no local user, a system may not have the ability to be reset, and a reset and subsequent successful boot may not be possible. Such systems that may not have a local user include, for example, an embedded device, telecom computing platforms, or a remote base station. A need may exist for a method and/or apparatus of reliably booting a computer system, which may detect and respond to unsuccessful boots even when there is no local user available.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

It is important to note that any reference in this specification to "one embodiment" or "an embodiment" means that a particular feature, structure or characteristic described in connection with the embodiment is included in at least one embodiment of the claimed subject matter. The use of the phrase "one embodiment" in more than one place in the specification does not necessarily refer to the same embodiment.

When a computing system is initially powered on, a load and boot process typically initiates. A primary step in the load and boot process may include initiation of a basic input/output system (BIOS). This initiation may be via a jump instruction embedded in system memory, directing the computing system processor to jump to BIOS code. BIOS may, for example, perform a system test upon power up, referred to as a power on system test (POST). BIOS typically controls many functions of the computing device, and may, for example, instruct the computing system microprocessor to detect components of the computing system and determine if they are operating properly. As part of this process, the BIOS may additionally instruct the microprocessor to access one or more particular pieces of software, which may be installed on a data storage medium such as a hard drive or floppy drive, for example. This may result in an operating system being loaded. Once an operating system is loaded, typically a computing system has completed the load and boot process, and is ready to receive further instructions.

Once the operating system is successfully loaded, the operating system may receive instructions to initiate one or more applications. During execution of these one or more applications, the one or more applications may "hang", or stop responding. This may be due to a number of factors, such as a corrupted system file or a malfunctioning hardware component. In a many computing systems, a system watchdog timer may be integrated into the system. This system watchdog timer may be a device that includes the capability to perform timing functions, and may be capable of issuing hardware or software resets for a computing system. The system watchdog timer may monitor one or more applications being executed on the operating system, and if the one or more applications doesn't respond in a particular period of time, the timer may terminate the application, for example. This system watchdog timer may be useful in detecting and responding to applications being initiated by the operating system, but is functional only after successful booting of the operating system. A system watchdog timer, such as the one previously described, may be useful in implementing a method and/or apparatus for reliably booting a computing system, as will be explained in more detail hereinafter.

Figure 2:
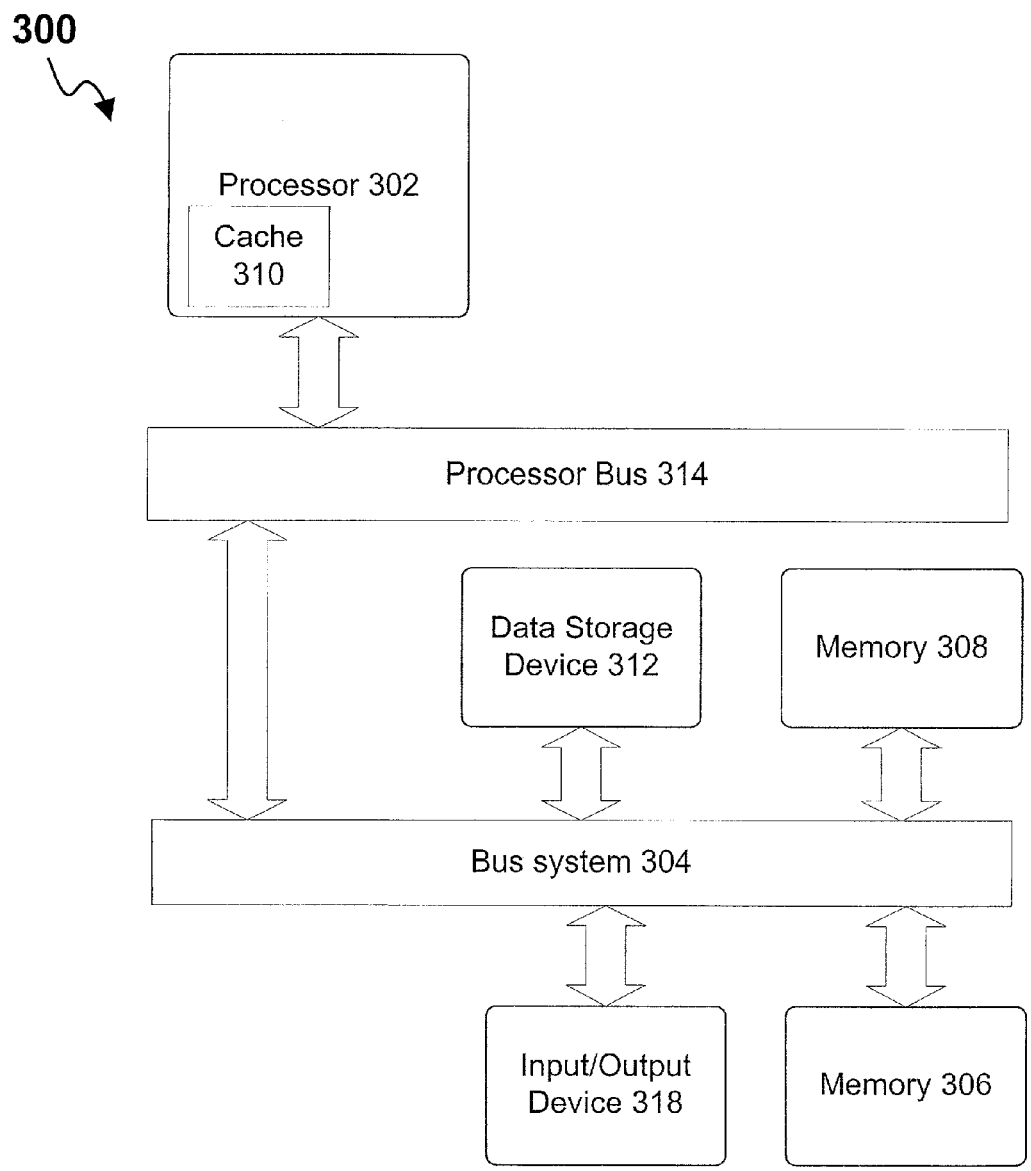
FIG. 2 is a second block diagram of a system suitable for practicing one embodiment of the claimed subject matter.

Embodiments of the claimed subject matter may comprise a method and/or apparatus for reliably booting a computing system. One embodiment comprises a computing system, which may be further described in reference to FIG. 2, although alternative embodiments exist. Referring now FIG. 2, a computing system 300 in accordance with one embodiment of the claimed subject matter may be comprised of the following components. System 300 may include a processor 302 that processes data signals, and may comprise, for example, a PENTIUM®III or PENTIUM® 4 microprocessor, available from Intel Corporation. Processor 302 is coupled to a processor bus 314, which may transmit data signals to other components of the computing system 300. Examples of other components may include random access memory 306, and read only memory 308, for example. Memory 306 and/or 308 may store instructions and/or data represented by data signals that may be executed by processor 302. The instructions and/or data may comprise code for performing any and/or all of the disclosed techniques, for example. Memory 306 and/or 308 may also store additional software as will be described, and/or data in accordance with at least one embodiment, including a number of files for an operating system such as the Windows® operating system or a system BIOS. Typically, operating system files may have been preloaded at an originating computer manufacturing facility, and may comprise a predefined set of hardware and software configuration parameters. These parameters may be applicable to a particular computer as it is originally configured or it may be a hypothetical set of configurations, which may or may not correspond precisely to the configuration of the computer. The software alternatively may be stored on a data storage device 312, such as, for example, a floppy disk drive, a CD-ROM device, a flash memory device, a digital versatile disk (DVD), or other storage device, in which case a special disk partition may provide an area for one or more of the preceding files. A cache memory 310 may reside within processor 302 that stores data signals received from memory 306 and/or 308. Data signals may be sent and/or received by the computing system through I/O device 318. System 300 may comprise one or more bus systems 304. Bus system 304 may be a single bus, or a combination of multiple buses. Bus system 304 may include an I/O bus, a Peripheral Components Interconnect (PCI) bus, a Personal Computer Memory Card International Association (PCMCIA) bus, a hublink bus, or an Industry Standard (ISA) bus, for example. Bus system 304 may provide logical connections to one or more of the components named previously. Additionally, one or more controllers (not shown) may be coupled to the one or more buses, and provide routing of data signals, for example. In accordance with the claimed subject matter, a processing system embodying components in accordance with the claimed subject matter includes any system that has a processor, such as, for example, a digital signal processor (DSP), a microcontroller, an application specific integrated circuit (ASIC), or a microprocessor.

Figure 1:
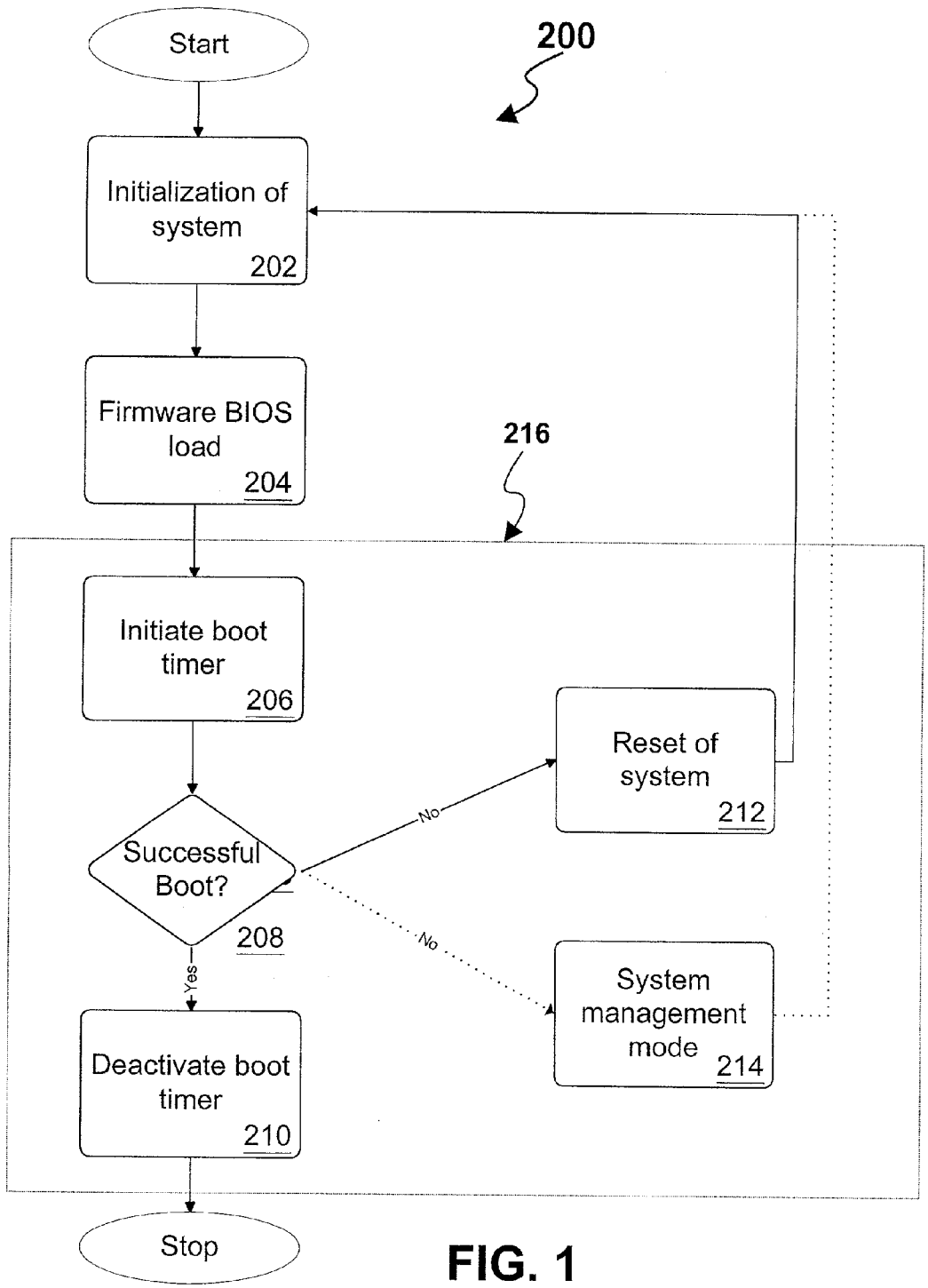
FIG. 1 is a first block flow diagram illustrating the logic performed by one embodiment of the claimed subject matter.

As stated previously, during a load and boot process, the computing system can "hang" or not boot properly. In this context, hang refers generally to the state a computing system may be in if the load and boot process is not successfully completed, and the computing system is not fully functional due at least in part to the uncompleted process. In the case where a computing system does not successfully complete the load and boot process, user intervention may be required, and a hard reset of the system may be the only way to resolve such a condition. One embodiment of the claimed subject matter comprises a method and apparatus for ensuring that a computing system is reliably booted. Flowchart 100 of FIG. 1 demonstrates a method of reliably booting a computing system in accordance with the claimed subject matter, in the form of a block flow diagram of programming logic. In this embodiment, the method for reliably booting a computing system may be operating as software and executed by a processor of a computing system, such as processor 302 of system 30, for example. It can be appreciated that the sequence of the logic may be modified and still fall within the scope of the claimed subject matter. In this embodiment, the first step in the logical flow is when a computing system is powered on, or initiated, as indicated at functional block 202. In this embodiment, upon initiation the BIOS may be accessed, as shown at functional block 204. Access of the BIOS may require access of firmware such as read-only memory 308 or random access memory 306, although the claimed subject matter is not limited in this respect. Upon performing the functions at functional block 204, one embodiment of the method of reliably booting a computing system, represented by subsection 216 of flowchart 200, may be initiated. This software 216 may be referred to as a boot loader. The boot loader software 216 may be located in memory 306, 308 or 312 of FIG. 2, for example, although alternative locations for the software exist. The boot loader 21 6 may be configured to utilize one or more functions of a system watchdog timer, such as the type previously described, and may initiate the watchdog timer, and set the watchdog timer to expire in a particular period of time. The particular period of time may be determined by a number of methods, described in more detail later.

Once components of the boot loader 216 are loaded, a timer, such as a system watchdog timer, is initiated at block 206. Upon initiation of the timer, functional block 208 includes the capability to monitor the load and boot process, and determine whether or not a load and boot process was completed or substantially completed prior to expiration of the timer initiated at functional block 206. If, for example, the load and boot process is completed or substantially completed, one step in the load and boot process may be to reset or deactivate the timer 206, represented at functional block 210. Once timer 206 is reset or deactivated at functional block 210, the boot loader 216 will typically not reset the computing system, and if the load and boot process is not yet complete the process may continue uninterrupted to completion. However, if boot loader timer 206 expires prior to a load and boot process being completed or substantially complete, a "hang" may be present. This hang may be due to a number of causes, as described previously. If, at functional block 208, a determination is made that the load and boot process is not successful, in this embodiment two options are possible. The boot loader 216 may instruct the system to reset, shown at functional block 212. This may be a complete shut down of power, typically followed by a power up and return to functional block 202. Alternatively, the boot loader 216 may instruct the system to enter system management mode (SMM) 214, which may be a mode that allows access to the computing system prior to a reset, for purposes such as diagnostic checks or storage of data relating to the previous boot attempt. At functional block 214, the boot loader software may then operate to reset the system and return to functional block 202, or it may not reset and stay in system management mode. One or more files relating to the load and boot may be transferred to a display device or data storage device such as memory 306, 308 or 312 of FIG. 2, for example in this alternative logical flow, but the claimed subject matter is not so limited. It will, of course, be understood that other methods not described in detail herein may also be in accordance with the claimed subject matter.

An unsuccessful boot, or hang, may be detected by a number of methods. One such method may comprise a failure of the boot loader 216 to receive a signal, the signal indicating the status of the boot process. This signal may indicate a successful boot, and may be sent from one or more components of the computing system 300, such as the operating system, and may be sent upon completion or substantial completion of a boot and load process. A failure to receive this signal may provide boot loader software 216 with an indication that the load and boot process was not complete or substantially complete, and functional block 208 may determine that there was not a successful boot. Alternatively, boot loader 216 may include the capability to access one or more files on a computing platform 300, and may access these one or more files after a particular period of time, such as, for example, upon the expiration of the previously described timer 206. These one or more files may be stored, for example, in memory 306 or 308, for example. In this embodiment, if the boot loader 216 is unable to access these one or more files, this may be interpreted as an indication that the load and boot process was not successfully completed. In this case, boot loader 216 may instruct a reset 212 of the computing system 300 in a method described previously, for example.

The time value of the timer 206 used by boot loader 216 may be determined, or set, by any number of methods. One such method for setting timer 206 may comprise the boot loader 216 timing one or more successful load and boot processes by the computing system 300, and then setting the value of timer 206 to approximately the time required to complete a successful load and boot process, which may, for example, be an average of the time required for several load and boot processes. Additionally, a user may determine the time value used by the timer 206, and may set the time through a user interface, such as I/O device 318, for example. Alternatively, the time value of the timer 206 may be a preset value of a system watchdog timer, and may be a preset value based on the type of operating system loaded into the computing system 300, or based the type or category of computing system 300, such as, for example, processor type. It will, of course, be understood that these are exemplary methods of timer setting, and numerous other methods exist which are in accordance with the claimed subject matter.

Boot loader software may be stored on firmware, such as, for example, memory 308 which may be ROM memory, for example. Alternatively, boot loader software may be stored on memory 306, which may be RAM memory, for example. Additionally, firmware may store a pointer that indicates where on another storage device components of the boot loader software may reside, such as data storage device 312, for example. In this particular embodiment, during the load and boot process, prior to the loading of a operating system, the boot loader software may be loaded from one or more memory locations which may be any combination of 306, 308 or 312, for example.

In the foregoing detailed description, numerous specific details were set forth in order to provide a thorough understanding of the embodiments of the claimed subject matter. It will be understood by those skilled in the art, however, that the embodiments of the claimed subject matter may be practiced without these specific details. In other instances, well-known methods, procedures, and components have not been described in detail so as not to obscure the claimed subject matter. Additionally, while certain features of the claimed subject matter have been illustrated as described herein, many modifications, substitutions, changes, and equivalents will now occur to those skilled in the art. It is, therefore, to be understood that the appended claims are intended to cover all such embodiments and changes as fall within the true spirit of the claimed subject matter.

What is claimed is:

1. A method for reliably booting a computer comprising:
   initiating a timer for a load and boot process;
   monitoring the load and boot process, wherein monitoring the system load and boot process includes receiving one or more electronic signals indicating the status of the boot process; and monitoring the load and boot process further comprises accessing one or more files located on the computing system, after a particular period of time has elapsed, wherein failure to access the one or more files indicates that the load and boot process was not successful; and
   deactivating the timer upon substantial completion of the load and boot process.

2. The method of claim 1, wherein the method further comprises resetting the computer system if the timer expires prior to completion of the load and boot process.

3. The method of claim 1, wherein the method further comprises sending the computing system into a system management mode if the timer expires prior to completion of the load and boot process.

4. The method of claim 1, wherein the timer is initiated after substantial completion of the loading of a basic input/output system (BIOS).

5. The method of claim 1, wherein failure to receive the one or more electronic signals from the computer system indicates that the load and boot process was not successful.

6. The method of claim 1, wherein the deactivating comprises stopping the timer.

7. The method of claim 1, wherein the timer comprises a system watchdog timer.

8. A machine-readable medium, having stored thereon instructions, that when executed by a computing system cause the computing system to, prior to completion of a load and boot process:
   access one or more memory locations on the computing system;
   initiate a software based timer found in the one or more memory locations;
   monitor at least a portion of the load and boot process, wherein to monitor at least a portion of the load and boot process includes to access one or more files located on the computing system, after a pre-determined period of time has elapsed, wherein failure to access the one or more files indicates that the load and boot process was not successful; and
   modify the timer when the load and boot process is substantially complete.

9. The machine-readable medium of claim 8, wherein the instructions, when executed, further cause the computing system to reset if the timer expires prior to completion of the load and boot process.

10. The machine-readable medium of claim 8, wherein the instructions, when executed, further cause the computing system to be sent into a system management mode if the timer expires prior to completion of the load and boot process.

11. The machine-readable medium of claim 8, wherein the timer is initiated after completion of loading the basic input/output system (BIOS).

12. The machine-readable medium of claim 8, wherein to monitor at least a portion of the load and boot process further includes to receive one or more electronic signals from the computer system indicating the status of the boot process, wherein failure to receive the one or more electronic signals indicates that the load and boot process was not successful.

13. The machine-readable medium of claim 8, wherein the modifying comprises stopping the timer.

14. The machine-readable medium of claim 8, wherein the modifying comprises resetting the timer.

15. The machine-readable medium of claim 8, wherein the timer comprises a system watchdog timer.

16. A computing system comprising:
   at least one processor;
   at least one memory device;
   at least one timer; and
   at least one bus, wherein said computing system includes the capability to, in operation, access the one or more memory devices on the computing system, initiate the timer, wherein the timer is substantially located in the memory device, monitor at least a portion of a load and boot process for the computing system, wherein to monitor at least a portion of a load and boot process includes to receive one or more electronic signals indicating the status of the load and boot process, wherein failure to receive the one or more electronic signals indicates that the load and boot process was not successful, and monitoring the load and boot process further comprises accessing one or more files located on the computing system, after a particular period of time has elapsed, wherein failure to access the one or more files indicates that the load and boot process was not successful; and modify the timer when the load and boot process is substantially complete, wherein the accessing, initiating, monitoring, and modifying are performed prior to the substantial completion of the load and boot process.

17. The computing system of claim 16, wherein the system further comprises the capability to reset if the timer expires prior to completion of the system boot process.

18. The computing system of claim 16, wherein the system further comprises the capability to enter into a system management mode if the timer expires prior to completion of the load and boot process.

19. The computing system of claim 16, wherein the monitoring comprises accessing the at least one memory device located on the computing system, after a particular period of time has elapsed.

20. The computing system of claim 16, wherein the modifying comprises stopping the timer.

21. The computing system of claim 16, wherein the modifying comprises resetting the timer.

22. The computing system of claim 16, wherein the timer comprises a system watchdog timer.

* * * * *